United States Patent [19]
Casamatta et al.

[11] Patent Number: 4,630,041
[45] Date of Patent: Dec. 16, 1986

[54] ENHANCED RELIABILITY INTERRUPT CONTROL APPARATUS

[75] Inventors: Angelo Casamatta, Cornaredo; Walter Fossati, Muggio', both of Italy

[73] Assignee: Honeywell Information Systems Italia, Milan, Italy

[21] Appl. No.: 569,127

[22] Filed: Jan. 9, 1984

[30] Foreign Application Priority Data

Jan. 31, 1983 [IT] Italy ............... 19347 A/83

[51] Int. Cl.⁴ .................. H04Q 1/00; G06F 3/04
[52] U.S. Cl. ..................... 340/825.5; 340/825.51; 364/200; 371/71
[58] Field of Search .......... 340/825.12, 825.5, 825.51; 370/85, 86, 91, 92; 371/62, 71, 67; 364/200

[56] References Cited

U.S. PATENT DOCUMENTS 3,534,339 10/1970 Rosenblatt .
3,604,906 9/1971 Hunter et al. ............... 371/67
3,796,992 3/1974 Nakamura et al. ............ 370/92
3,944,975 3/1976 Yasumoto et al. ............ 371/71
4,001,734 1/1977 Bardotti .
4,034,349 7/1977 Monarco et al. ............. 364/200

FOREIGN PATENT DOCUMENTS 2539821 9/1975 Fed. Rep. of Germany .
2654247 11/1976 Fed. Rep. of Germany .

OTHER PUBLICATIONS

Patent Abstracts of Japan, vol. 6, No. 129 (p. 128) (1007), 15th Jul. 1982, Application No. 5755437 (Canon K. K.) 2/04/82.
Patent Abstracts of Japan, vol. 6, No. 129 (p. 128) (1007), 15th Jul. 1982 Application No. 5755437 (Canon K. K.) 02/04/1982.

Primary Examiner—Ulysses Weldon
Assistant Examiner—Ralph Smith
Attorney, Agent, or Firm—Nicholas Prasinos; John S. Solakian

[57] ABSTRACT

Interrupt control apparatus in a data processing system for acknowledging on a priority basis one among several possible asynchronous interruptions (INT1, INTN), such apparatus comprising a priority network (5), a latching (7) and a validation circuit (11,12). The priority network directly receives on its input terminals the asynchronous interrupt signals and provides on its output terminals a binary code corresponding to the highest priority interrupt present on its input terminals. The interrupt code is latched in the register and is present on its output terminals. The code latched in the register is used by a validation circuit as a selection code of the related input interrupt signal. If such a signal is present, the code is validated, i.e., it is transferred to the central unit of the system. If the selected interrupt signal is not present, the code is not validated.

3 Claims, 4 Drawing Figures

ENHANCED RELIABILITY INTERRUPT CONTROL APPARATUS

BACKGROUND OF THE INVENTION

1. Field of the Invention

The present invention relates to an enhanced reliability interrupt control apparatus in a data processing system.

2. Description of the Prior Art

Data processing systems basically include a central processor, a working memory and a plurality of peripheral units which are connected, either individually or in groups, to the central processor by means of suitable control interface units. The information transfer between central processor and peripheral units can take place according to several methods. But generally, when such transfer is required by the peripheral units, the method used most is the so-called "interrupt" method. According to the interrupt method, each peripheral unit which wants to exchange information with the central processor sends to the processor a signal indicative of an interrupt request. The central processor may then interrupt the execution of the program in progress and devote itself to servicing the interrupting peripheral unit. It is to be noted that several interrupts may be sent at the same time to the central processor by the several peripheral units. Obviously, the central processor can only service one interrupt at a time. It is therefore necessary to assign some priority criteria, that is to define which among several simultaneous interrupt requests has to be considered first. (It is to be noted that the interrupt requests are sent to the processor in a completely asynchronous way). It is therefore necessary that the central processor be provided with a synchronizing device which allows it to consider the highest priority interrupt during a fixed interval of time during its cycle. Among the several prior art solutions used to solve the above problems, the polling method or the cascade reciprocal conditioning method of the several interrupts are most often used, and require a latching register and an encoding network. Every peripheral unit is provided with a connection lead which transfers the interrupt request as a logical electrical signal at a predetermined level to a corresponding input terminal of the latching register. The latching register is cyclically enabled by a clock signal generated by the central processor and loads into its cells all the possible interrupt requests which are present when such clock signal occurs. The latching register output terminals are connected to a logic network which arranges, according to a predetermined priority, all the interrupt requests received on its input terminal and transfers to its output terminal only that interrupt request with the highest priority among all the possible interrupt requests present at the same time. The interrupt request thus transferred to the output terminal by the interrupt control apparatus is presented and used by the central processor in coded form. Obviously, the output terminal of the interrupt control apparatus has to be enabled with some delay after the time defined by the clock signal which latches the possible interrupts into the register. This is necessary in order to permit the signals to propagate inside the logic network as far as the output and have a stable state of the output signals.

Interrupt control apparatus of the type discussed are discribed in U.S. Pat. Nos. 3,534,339 and 4,001,784. However, such apparatus present problems. In the first place, the latching register must have a number of cells equal to the number of leads used for transferring separate interrupt signals, which are at least equal to the number of peripheral units. Additionally, if the peripheral units may send interrupt signals of different types on separate leads, the number of register cells has to be increased. It follows that, in the event of a great number of peripheral units, the latching register must have a large capacity and, therefore, is expensive. Although integrated circuits are available on the market which work as registers with a capacity of 4 or 8 bits, the 8-bit registers are not provided with a reset input which is essential during the initializing phase of the system. Accordingly, the designer must use a 4-bit register or, if 8-bit registers are chosen, additional logic elements must be used for an initializing reset circuit.

A further disadvantage of the prior art interrupt control apparatus is that noise pulses may be present on some interrupt leads during the time interval that the strobe signal latches the interrupt signals into the register. A noise pulse, if latched, is interpreted as an interrupt signal and may cause an erroneous working of the central processor.

These disadvantages are overcome by the interrupt control apparatus of the invention.

OBJECTS OF THE INVENTION

A primary object of the invention, therefore, is to provide an improved interrupt apparatus.

Another object of the invention is to provide interrupt apparatus which is relatively inexpensive.

Still another object of the invention is to provide a more reliable interrupt apparatus.

These and other objects of the invention will become apparent from the description of a preferred embodiment of the invention when read in conjunction with the drawings contained herewith.

SUMMARY OF THE INVENTION

The apparatus of the invention comprises a priority logic network receiving on its input terminals the signals present on the interrupt leads. Such network provides on its output terminals a binary code representative of the highest priority interrupt present simultaneously on its input terminal. This binary code is latched by means of a synchronizing signal into an interrupt register connected to the output terminals of the priority logic network. Since a binary code of n bits represents $2^n$ distinct combinations, if the interrupt requests to be latched are $2^n$, a register of n cells is sufficient. Therefore, the latching register of the present invention is smaller than those of the prior art apparatus. According to the invention, the interrupt control apparatus further comprises a validation network for the code latched in the register. Such validation network assures that the latched interrupt code really corresponds to an interrupt request present on an input of the priority network and has not been generated by a spurious transient signal due to input noise or to transient states of the priority network. The validation network is implemented inexpensively and simply by a multiplexer which receives the interrupt request and selects a valid request to latch into the interrupt register. It then provides on its output terminal a signal at a logical level equal to the one present on its selected input terminal. If the selected interrupt signal is actually active, it is transferred to the multiplexer output and sets a validated interrupt flip-flop. In other words, an interrupt code, depending on the electric state of the interrupt leads, is loaded at a predetermined time into the interrupt register. The validation network then verifies the presence of the selected interrupt at a subsequent time.

BRIEF DESCRIPTION OF THE DRAWINGS

These and other features will become apparent from the following description of a preferred embodiment of the invention and from the enclosed drawings where.

DESCRIPTION OF THE PREFERRED EMBODIMENT

Figure 1:
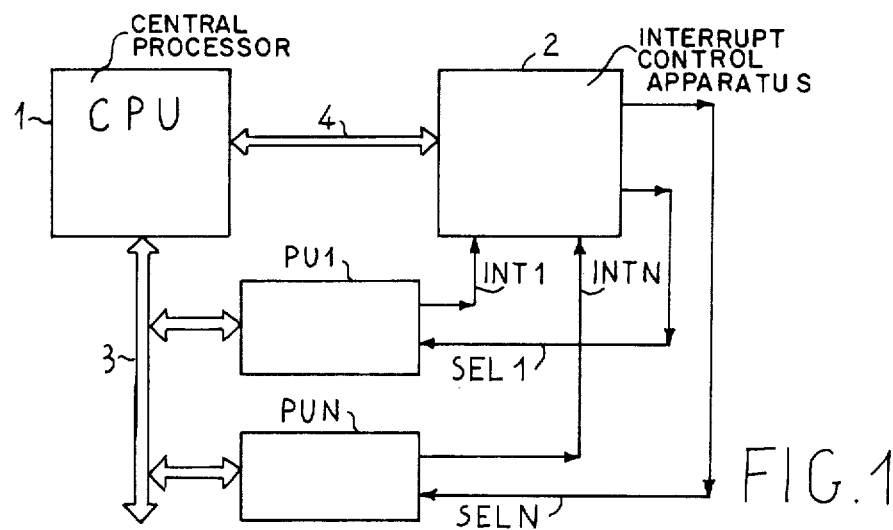
FIG. 1 is a simplified block diagram of a data processing system.

FIG. 1 shows, in a simplified block diagram, the organization of a data processing system. The system includes a central processor 1, a plurality of peripheral units PU1, PUN, and an interrupt control apparatus 2. Although the apparatus 2 is shown as a separate block, it may be integral to the central processor 1. Each of the peripheral units and the central processor communicate with each other through a bus 3. The information exchange through bus 3 takes place between processor 1 and only one peripheral unit at a time. If an information exchange is not in progress on bus 3, central processor 1 may select a peripheral unit and start an information exchange with it. Similarly, a peripheral unit may send an interrupt request and acquire bus access for exchanging information with the central processor. If the interrupt request is accepted, the central processor selects the interrupting peripheral unit. The selection of the peripheral units, as well as the acknowledgment of the interruption, is performed by the interrupt control apparatus 2. Apparatus 2 is connected to each of peripheral units PU1, PUN through a lead INT1, INTN, respectively, on which each peripheral unit transmits a related interrupt signal. Apparatus 2 is further connected to each of peripheral units PU1, PUN through a lead SEL1, SELN, respectively, on which the interrupt control apparatus transmits to each peripheral unit a related selection signal. Processor 1 and apparatus 2 communicate with each other through a channel 4. The information exchanged through channel 4 is shown in FIG. 2.

Figure 2:
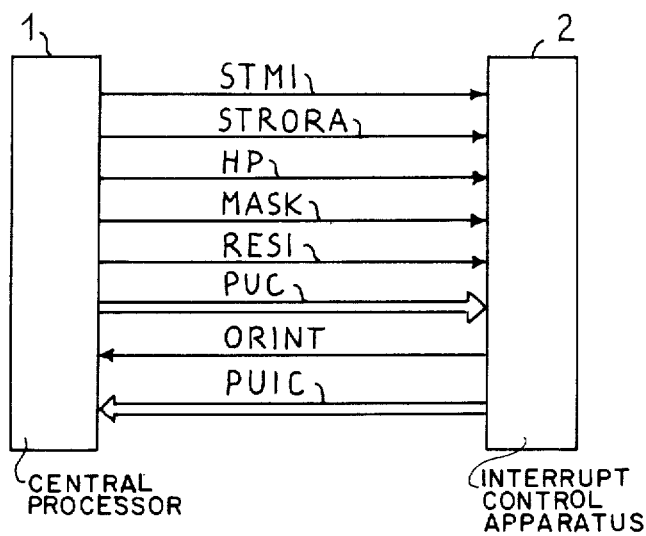
FIG. 2 shows, diagrammatically, the signals exchanged in the system of FIG. 1 between the central processor and the interrupt control apparatus of the present invention.

Referring to FIG. 2, central processor 1 sends to apparatus 2 the timing signals STMI, STRORA and:

a signal HP indicating, when active, that it is executing operations at a high level and cannot be interrupted;

a command MASK by means of which the interrupt request is masked and is not to be considered by the interrupt control apparatus;

a suitable reset command RESI;

a code PUC of peripheral unit selection.

Apparatus 2 sends to central processor 1 a general interrupt signal ORINT and a code PUIC indicative of the interrupting peripheral unit.

Figure 3:
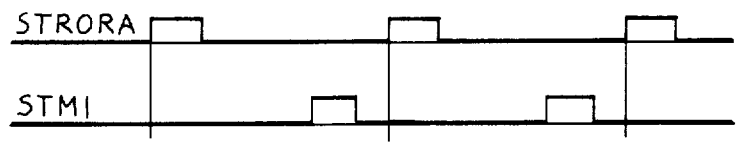
FIG. 3 shows a timing diagram of some signals sent by the central processor to the interrupt control apparatus of the present invention.

Referring now to FIG. 3, there is shown timing diagrams of signals STRORA and STMI. Signal STRORA is a cyclical timing pulse which defines by its rising edge the start of a machine cycle of the central processor. Signal STMI is a cyclical timing pulse which rises to logic level 1 during each machine cycle. The function of signals STRORA and STMI in the interrupt control apparatus will will be seen infra.

Figure 4:
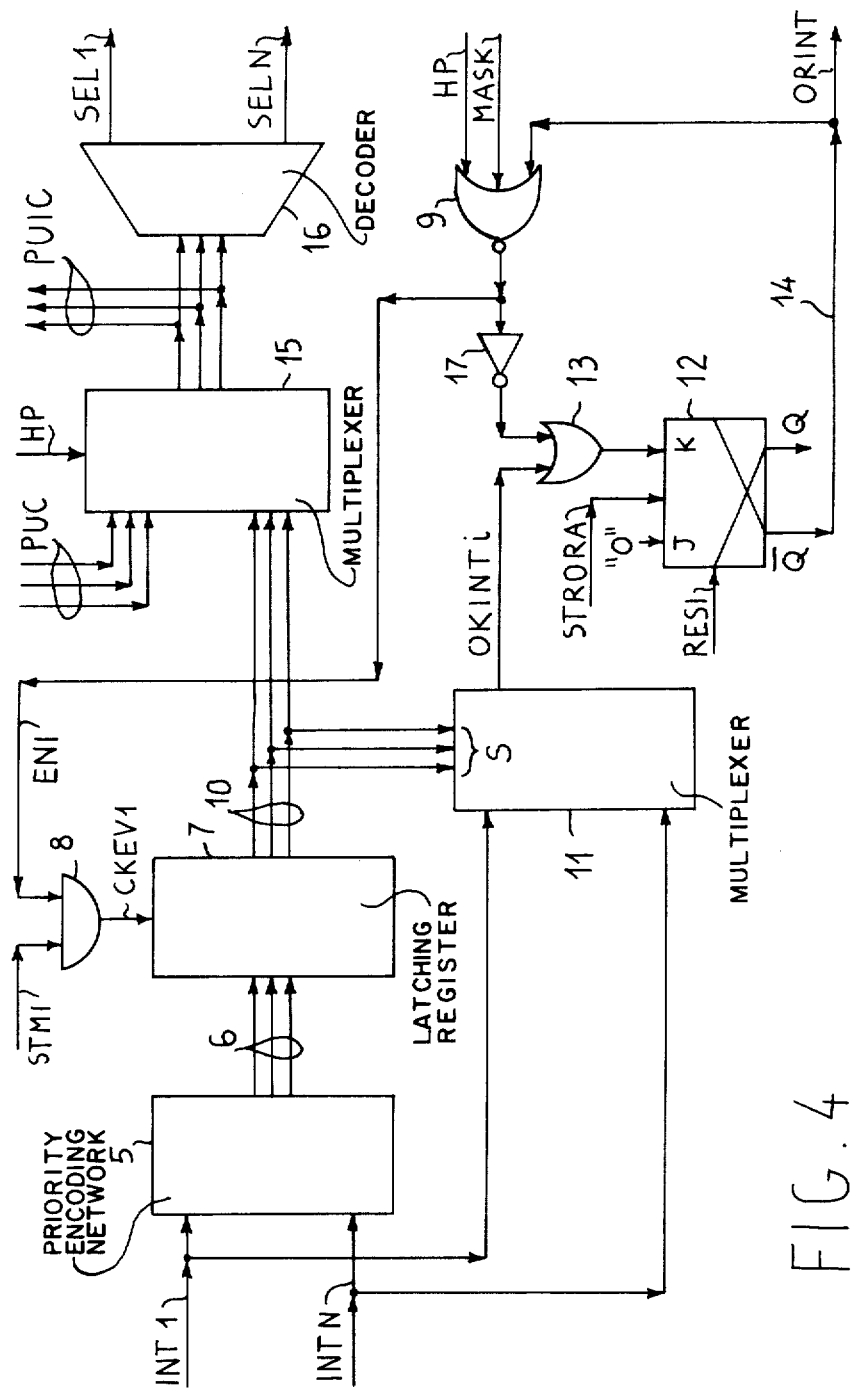
FIG. 4 shows a preferred embodiment of the interrupt control apparatus according to the present invention.

FIG. 4 shows schematically the interrupt control apparatus 2 according to the present invention. Apparatus 2 comprises a priority encoding network 5 which asynchronously receives interrupt signals INT1, INTN coming from the several peripheral units. For instance, each of such signals is inactive if at logic level 1, and representative of an interruption if at logic level 0. Encoding network 5 assigns a relative priority to the several interrupt signals received on its inputs (e.g., a relative priority increasing according to the order number from INT1 to INTN) and provides on output lines 6 a code representative of the highest priority interrupt present on its inputs. Encoding network 5 is a combinatorial logic network and has no latching function. Therefore, it operates asynchronously as the asynchronous events occur on its inputs. The output terminals of network 5 are connected to the input terminals of a latching register 7 which loads the information present on its input terminals into its cells upon the rising edge of a clock signal CKEV1. Clock input of register 7 is connected to the output terminal of a two-input AND gate 8 which respectively receives timing signal STMI and a signal ENI present on the output terminal of a three-input NOR gate 9. NOR gate 9 respectively receives signal HP, signal MASK and signal ORINT generated by the interrupt control apparatus. Even if only one of such signals is at logic level 1, signal ENI is at logic level 0, and AND gate 8 is disabled. In other words, signal CKEV1 goes to logic level 1 with signal STMI only if signals HP, MASK, ORINT are at logic level 0. Output lines 10 of register 7 are connected to selection input lines S of a multiplexer 11, whose input terminals are coupled to interrupt leads INT1, INTN. The code present on outputs 10 is then used as multiplexer selection code. When such code is indicative of an interrupt signal on lead INT1, the signal present on lead INT1 is transferred to the output of multiplexer 11. If signal OKINT on multiplexer output is at logic level 0, this means that interrupt INT1 is really present also after the loading of related code into register 7. Signal OKINTi at logic level 0 therefore validates interrupt INT1 and assures that the content of register 7 is not the result of transient signals present on register input terminals but of an interrupt INT1 present on the input terminals of the interrupt control apparatus at least throughout the propagation time across the logic chain (network 5, register 7, multiplexer 11). Signal OKINTi at logic level 1 indicates that the code latched into register 7 is not indicative of an interrupt present. Register 7 therefore contains an erroneous interrupt code due to noise pulses on the interrupt leads or to logical switching in progress inside network 5 when register 7 was loaded. Any uncertainty about the validity of the code loaded into register 7 is therefore removed by considering signal OKINTi. The output terminal of multiplexer 11 is connected to K input terminal of a J-K flip-flop 12 through an OR gate 13. Flip-flop 12 receives a signal on its J input terminal which is permanently at logic level 0, and also receives an input signal STRORA on its clock. When a signal at logic level 0 is present on K input terminal of flip-flop 12, output terminals Q and $\bar{Q}$ toggle with the rising edge of the signal STRORA. If a signal at logic level 1 is present on the K input terminal, flip-flop 12 does not change its state. The rest state of flip-flop 12 is a set state. Flip-flop 12 is set in rest by signal RESI at logic level 0 which is applied to set input and set in active state (or reset) by signal STRORA if input K is at logic level 0. Output terminal $\bar{Q}$ is connected to lead 14 on which signal ORINT is present. Such signal, when at logic level 1, indicates to the central processor 1 that a validated interrupt code is present in register 7. As previously stated, signal ORINT is further applied to an input terminal of NOR gate 9. Output terminal of NOR gate 9 is connected to an input of AND gate 8, and to a second input of OR gate 13 through a NOT gate 17. In other words, flip-flop 12 is reset only if the same conditions enabling the loading of register 7 are verified. The interrupt control apparatus of the invention further includes a multiplexer 15 and a decoder 16. Multiplexer 15 receives on first input lines from the central processor a code PUC indicative of the peripheral to be selected. It also receives on second input lines the interrupt code present on output terminals of register 7. Signal HP provided by central processor 1 is applied to the selection input terminal of multiplexer 15. When signal HP is at logic level 0, code PUC on the first input lines of multiplexer 15 is transferred to output its output lines. When signal HP is at logic level 1, the code present on the second input lines of multiplexer 15 is transferred to its output lines. Output lines of multiplexer 15 are further connected to the input lines of decoder 16 which decodes the input code in a selection signal SEL1 at suitable logic level (e.g., logic level 0) on one of N leads SEL1, SELN of peripheral unit selection.

The operation of the interrupt control apparatus is very simple. Let us suppose at first that no peripheral unit has interrupt requests in progress (signals INT1, INTN at logic level 1). Signal ORINT which has been sent to the central processor 1 by apparatus 2 is therefore at logic level 0. If central processor 1, during a machine cycle, wants to start a dialogue with a predetermined peripheral unit, it sends to apparatus 2 at the beginning of the machine cycle a signal MASK at logic level 1 and, at the same time, puts on channel 4 code PUC of peripheral unit identification. Code PUC is decoded by decoder 16 and a corresponding signal of peripheral unit selection is generated. A dialogue betwwen the central processor and peripheral unit can therefore start. It takes place through bus 3 and generally lasts for several processor cycles. During such cycles, apparatus 2 is inhibited from receiving any interrupt, that is, the loading of register 7 and the activation of flip-flop 12 are inhibited. At the beginning of the last dialogue cycle, signal MASK goes to logic level 0 so that during such last cycle STMI enables the loading of register 7. The highest priority interrupt of the possible pending interrupts is loaded in coded form into register 7. Such interrupt is validated as to its code and, at the beginning of the successive cycle (signal STRORA, cycle 1) flip-flop 12 is reset and signal ORINT is sent to central processor 1. During such cycle (cycle 1) the central processor tests signal ORINT. At the same time, signal ORINT inhibits any change of the content of register 7 because of signal STMI. Central processor 1, because of the acknowledgment of signal ORINT at logic level 1, generates signal HP, that is, it gets ready to perform the received interruption at a predetermined priority level. Signal HP at logic level 1 permits the transfer on channel 4 of the code PUIC (i.e., the code loaded into register 7), at the same time such code is decoded by a command of the peripheral unit selection. During the subsequent machine cycles, the required dialogue between central processor and peripheral unit takes place. At the beginning of the last cycle of such dialogue, the central processor sends a pulse RESI which inactivates, (that is, sets), flip-flop 12 and lowers signal HP to logic level 0. The acknowledgment of a new interrupt signal is therefore enabled. Possible spurious interrupt signals, which are not validated by the interrupt control apparatus, do not cause the switching of flip-flop 12 and are therefore neglected.

The apparatus of FIG. 4 may be easily carried out with commercially available integrated circuits. For example, encoding network 5 is constructed with a TTL integrated 74LS148 circuit marketed by several manufacturers. Register 7 is a 74LS195A integrated circuit. Multiplexer 11 is a 74LS251 integrated circuit. Multiplexer 15 is a 74LS257 integrated circuit. Decoder 16 is a 74LS138 integrated circuit. In the event that the number of system peripheral units is greater than 8, the apparatus of FIG. 4 may still be implemented with the above mentioned circuits suitably put in parallel to achieve the required parallelism and with the addition of few logic elements. This is easily implemented by persons of ordinary skill in the art.

What is claimed is:

1. An interrupt control apparatus for acknowledging on a priority basis and validating one among several possible asynchronous interrupt requests (INT1, INTN) comprising:

a priority encoding network receiving on its input terminals said interrupt requests and providing on its output terminals a code representative of the highest priority interrupt amoung those present simultaneously on its input terminals;

a latching register receiving on its input terminals said code, said register being cyclically enabled to load said code; and, a selection circuit receiving on its data input terminals said interrupt and on its selection input terminals said code as output from said register, said selection circuit selecting that one among several said interrupts which is represented by said code, said selection circuit providing on its output terminal a validation signal at a first logic level when said selected interrupt is really present and an invalidation signal at a second logic level when said selected interrupt is not present.

2. Interrupt control apparatus of claim 1 further comprising a flip-flop to latch said validation/invalidation signal, said flip-flop being cyclically activated with said register but with a predetermined time delay relative to said register.

3. Interrupt control apparatus of claim 2 further comprising circuit means to inhibit the cyclical enabling of said register and said flip-flop when said flip-flop is in a first state latching said validation signal, said flip-flop being set in a second state by a command from a central processor.

* * * * *